June 1, 1937. W. L. MELTON 2,082,713
ELECTRICAL MOTOR DRIVE FOR CENTRIFUGAL OIL TESTING MACHINES
Filed Oct. 21, 1936
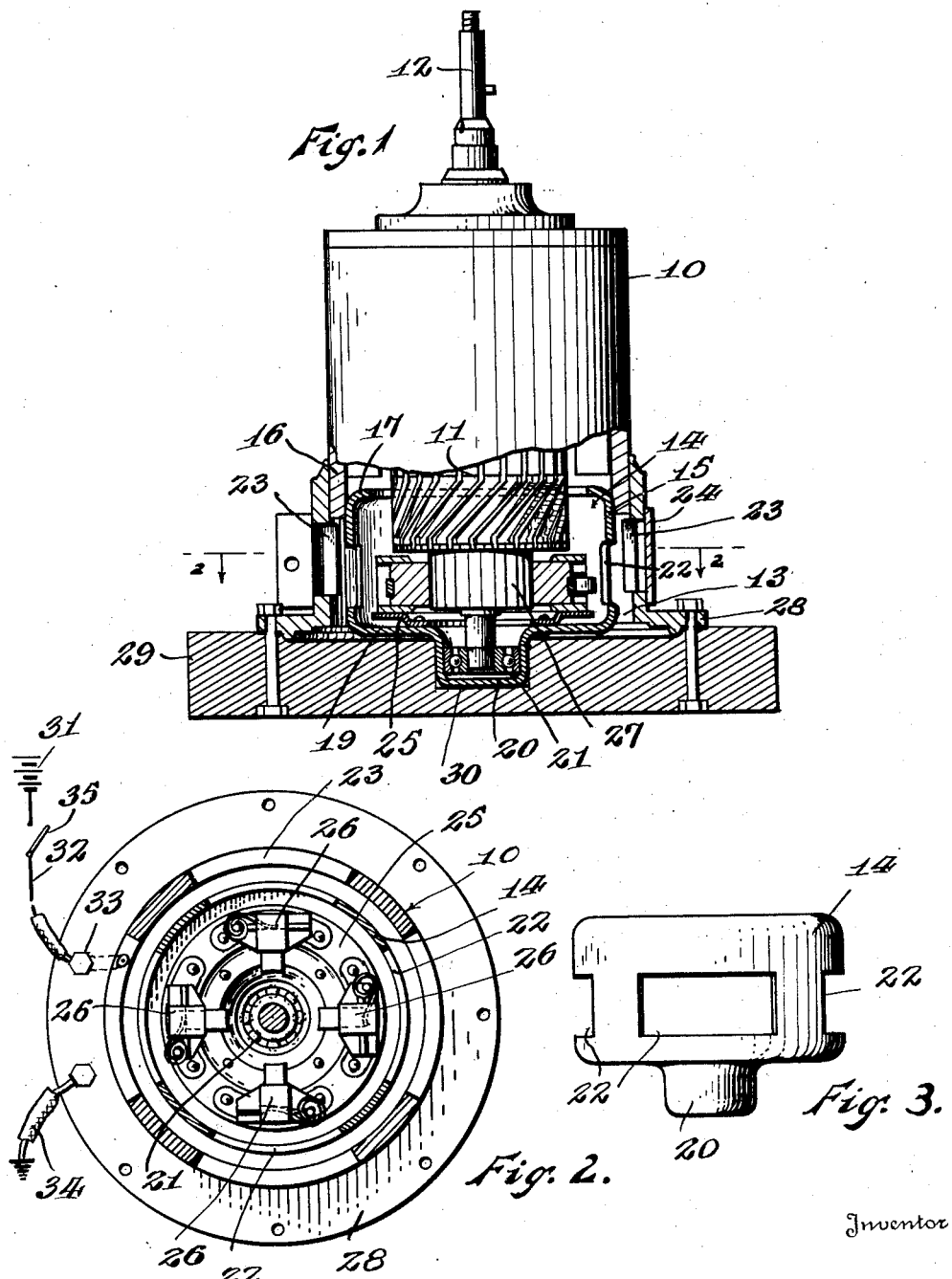
Inventor:
W. L. MELTON,
By Christian R. Nielsen,
Attorney.

Patented June 1, 1937

2,082,713

UNITED STATES PATENT OFFICE 2,082,713

ELECTRICAL MOTOR DRIVE FOR CENTRIFUGAL OIL TESTING MACHINES

William L. Melton, Overton, Tex., assignor of one-half to D. E. France Russell, Overton, Tex.

Application October 21, 1936, Serial No. 106,877

3 Claims. (Cl. 171—252)

My invention relates to portable centrifugal oil testing machines and more particularly to an electric drive therefor and it consists in the constructions, arrangements and combinations herein described and claimed.

It is the cardinal purpose of the invention to provide a portable electric drive for a centrifuge of a construction which may be suitably mounted upon a motor vehicle driven by a six volt electric motor and deriving its electromotive force from the usual battery of the motor vehicle.

It is also an object of the invention to provide a novel construction of motor so encased as to preclude liability of fire hazards.

It is a still further object of the invention to provide a novel construction of thrust bearing for the armature of the motor.

Additional objects, advantages and features of invention will be apparent from the following description considered in conjunction with the accompanying drawing, wherein Figure 1 is an elevational view of the motor, partly in section.

Figure 2 is a cross section on the line 2—2 of Figure 1.

Figure 3 is a detail elevation of the bearing housing.

There is illustrated a motor 10 having an armature 11, the shaft 12 of which projects upwardly for mounting of any conventional centrifuge oil testing apparatus.

The motor 10 will be mounted in a vertical position, as shown in Figure 1, the base of the motor being open as shown at 13, and securely fixed therein, I provide a bearing housing 14. The housing 14 is cylindrical, the vertical wall 15 of which frictionally binds upon the interior of the shell 16 of the motor and the upper horizontal wall 17 of the casing is provided with an opening 18 of a size to freely admit the armature 11 therethrough. The lower wall 19 of the housing has an integrally formed cup member 20 projected below the wall 19 and houses a ball bearing race 21. The race 21 is in alignment with and receives the lower end of the armature shaft 12. From the structure thus far set forth, it will be apparent that the armature 11 will be rigidly supported for rotation in a vertical plane.

The housing 14 is provided with openings 22 in its vertical wall adapted to align with openings 23 of the motor casing, thus permitting access to the brushes and commutator of the motor. An expansible band closure member 24 is employed for closing the openings 23.

Mounted upon the upper face of the wall 19 there is an annular ring 25 circumscribing the cup member 20 serving as a means for mounting four brushes 26 disposed for cooperation with the commutator 27 of the armature.

The casing of the motor is provided with an annular mounting flange 28, suitably apertured for mounting, by means of bolts, to a wooden base member 29. The base 29 will be formed with a depressed portion 30 accomodating the cup member 20.

The motor will be energized through the usual battery of the motor vehicle, indicated at 31, through the lead 32 connected to a binding post 33, the ground connection being indicated at 34, which preferably will be a portion of the vehicle frame. A switch 35, of any approved construction, may be installed in the line 32 for control of the motor.

From the foregoing it will be seen that I have provided a simplified and practical form of motor drive for a centrifuge, well insulated by the wooden base from direct contact of metallic portions of the motor vehicle, thus eliminating liability of sparks preventing ignition of oil undergoing a test.

I claim:—

1. A drive for centrifuge oil testing machines comprising an electric motor having an armature mounted for rotation in a vertical plane, said motor having a casing open at one end and including a circumferential flange, a cylindrical shell member fixed in the open end of the casing of the motor, the shell having a cup member projecting below the flange, a bearing in the cup member for support of one end of the armature, and an insulator block fixed to the flange and closing the open end of the casing, the block having a depressed portion for accommodation of the cup member.

2. A drive for centrifuge oil testing machines comprising an electric motor having an armature mounted for rotation in a vertical plane, said motor having a casing open at one end and including a circumferential flange, one end of the shaft of the armature projecting beyond the casing for mounting of a centrifuge, the opposite end having a commutator, a cylindrical shell member fixed in the open end of the casing of the motor and housing the commutator, the shell member having a downwardly disposed cup member, a bearing in the cup member for support of the armature shaft, a ring member mounted in the shell member, said ring member having brushes thereon for cooperation with the commutator, an insulator block fixed to the flange and closing the open end of the casing, and electromotive means for energizing the motor.

3. The structure of claim 2 wherein the motor casing and shell member have aligned openings permitting access to the commutator and brushes.

WILLIAM L. MELTON.